United States Patent
Holevas

(10) Patent No.: US 7,269,913 B2
(45) Date of Patent: Sep. 18, 2007

(54) UNIVERSAL TAPE MEASURE JACKET WITH DUAL MARKING DEVICES

(76) Inventor: Michael Holevas, 58-25 229th St., Bayside, NY (US) 11364

( * ) Notice: Subject to any disclaimer, the term of this patent is extended or adjusted under 35 U.S.C. 154(b) by 0 days.

(21) Appl. No.: 11/098,661

(22) Filed: Apr. 4, 2005

(65) Prior Publication Data
US 2006/0218810 A1    Oct. 5, 2006

(51) Int. Cl.
G01B 3/10    (2006.01)
B25H 7/04    (2006.01)

(52) U.S. Cl. .............................. 33/668; 33/767; 33/768
(58) Field of Classification Search .................. 33/668, 33/669, 755, 759, 761, 767, 768, 769, 770; D10/72
See application file for complete search history.

(56) References Cited

U.S. PATENT DOCUMENTS

| | | | | |
|---|---|---|---|---|
| 2,807,886 A * | 10/1957 | Aciego | | 33/668 |
| 3,148,455 A * | 9/1964 | Aciego | | 33/668 |
| 3,336,678 A * | 8/1967 | Chamberlain et al. | | 33/668 |
| 3,731,389 A * | 5/1973 | King | | 33/668 |
| 3,802,083 A * | 4/1974 | Freed | | 33/668 |
| 4,015,337 A * | 4/1977 | Taylor | | 33/668 |
| 4,630,376 A * | 12/1986 | Pentecost | | 33/760 |
| 4,760,648 A * | 8/1988 | Doak et al. | | 33/668 |
| 4,908,954 A * | 3/1990 | Johnson | | 33/768 |
| 4,965,941 A | 10/1990 | Agostinacci | | |
| 5,257,729 A * | 11/1993 | Silvernail | | 224/219 |
| 5,390,426 A * | 2/1995 | Hull | | 33/770 |
| 5,435,074 A | 7/1995 | Holevas | | |
| 5,577,329 A * | 11/1996 | States | | 33/768 |
| 5,671,543 A | 9/1997 | Sears | | |
| 5,809,662 A * | 9/1998 | Skinner | | 33/768 |
| 6,041,513 A | 3/2000 | Doak | | |
| D447,712 S * | 9/2001 | Hsu | | D10/72 |
| 6,434,854 B1 * | 8/2002 | MacColl et al. | | 33/668 |
| 6,574,881 B2 | 6/2003 | Cole, III | | |
| 6,612,046 B1 * | 9/2003 | Cimorell et al. | | 33/668 |
| 6,698,104 B2 | 3/2004 | Scarborough | | |

FOREIGN PATENT DOCUMENTS

| | | | |
|---|---|---|---|
| GB | 2322599 A | * | 9/1998 |
| JP | 11351801 A | * | 12/1999 |
| JP | 2000292103 A | * | 10/2000 |
| JP | 2002039701 A | * | 2/2002 |

* cited by examiner

Primary Examiner—R Alexander Smith
(74) Attorney, Agent, or Firm—Collard & Roe, P.C.

(57) ABSTRACT

The present invention is a universal tape measure jacket with dual retractable marking means capabilities. The universal tape jacket with dual marking means when retrofit over conventional tape measures creates an affordable measure and marking system. The tape locking means on most conventional tape measures could also be modified to be able to link with either/or of the retractable marking means on the universal tape jacket; thus, the user has the option to lock the tape coil into a fixed position and then manually engage one or both of the dual markers independent of the tapes locking means or when linked with one or more of the retractable markers, make them work in conjunction with the tape measures locking means. The versatility of this combination offers a measure and marking system that can perform various combinations involving measuring and marking without hindering or effecting any of the other various operations that may be necessary to perform with the tape measure under a variety of circumstances.

23 Claims, 4 Drawing Sheets

UNIVERSAL TAPE MEASURE JACKET WITH DUAL MARKING DEVICES

FIELD OF THE INVENTION

The invention relates to coilable tape measuring tapes with marking means attached to it.

THE PRIOR ART

Marking means have been shown to be built in within a taped coiled housing, as is in U.S. Pat. Nos. 6,698,104 and 4,965,941, however, the cost to produce one of these types of measuring tapes will be too costly. The replacement of a coiled tape within these types of measuring tapes will also make it a cumbersome task and possibly interfere with the marking means mechanics causing possible mal-functions after reassembly. This would be because the coiled tape would be extremely close to the moving parts of the marking means and may be disturbed during the process of interchanging the coilable tape.

Other patents such as U.S. Pat. Nos. 6,041,513, 6,574,881, and 5,671,543 have shown external applications of marking means attachments, these types though, are vulnerable to being broken off and becoming detached if the whole unit is accidentally dropped. However, it is likely more feasible to have an external marking means versus a built in marking means within a tape housing because of the simplicity to manufacture and the lower costs involved in producing such a combination.

Therefore, because the marking means of the present invention are within the universal tape measure jacket and externally from the coilable tapes housing, the jacket would be a more favorable solution as opposed to having the marking means built in within the tape measure. The universal jacket could also be made to encompass all of the tape housing or a great portion of it. In this manner, not only are the marking means protected within the universal tape measure jacket but the jacket now offers additional protection to the tape measure to prevent it from damages that may be incurred in the event of accidental droppings of such tape measures which are common. The universal tape jacket may be made of various materials such as metal, plastic, rubber, etc. The more favorable material would be a rubberized jacket that would protect better against falls and offer a gripping sensation to the user of the tape measure.

SUMMARY OF THE INVENTION

It is the intent of this invention to offer an inexpensive way of adopting a marking means method to conventional tape measures that are made without a marking means attached to them or built within them. It is also a further intent to offer a protective casing for the tape measure as a result of this new combination.

It is further intent of this invention to offer a marking means to several tape measures and not be limited to one particular size or shape of existing tape measures. Therefore, in the event the tape measure being used within this invention malfunctions, another one can be put in its place. The jacket will be able to house all the components of the marking means and therefore, would not interfere with the interchangeable tape measures it is adapted to accept.

The inventions universal tape measure jacket can be made to have dual marking means built within them or have dual housings to accept various marking means within them. These can be placed one on each side of the front of the tape measure.

The invention may also be made to have different sizes of universal jackets such as a small, medium and a large that would enable them to be better tailored for adaptation to the various existing tape measures that are currently being sold in today's market. For example, there could be one size that could fit over 12'-16' tape measures and another that would be able to fit over 25'-30' tape measures, etc. This however, should not be a factor to have limitations to the invention. There could be a jacket designed to have the dual marking means and be able to be adapted to an even greater varying sized tape measures. It may not be as aesthetically pleasing as having several better-tailored jackets for the various tape measures that are out there, but the function and the intent of this invention would be just as well served.

It is a further intention of this invention to have the marking means easily replaceable within the universal tape measures jacket which, may either be built within the jacket or offer housing compartments that are part of the jacket to accept a pen like marking means that can be used independent of this invention. In either case, whether, it is a pen like insert to fit in the housing or a stand alone marking means that may be inserted into the integrated housing portion of the universal tape jacket, the intent is to make it easily accessible for replacements.

The intent of the marking means is to be able to measure and mark off increments on any desired object without lifting ones hands off the tape measure. The user will have the option of marking off with either one of the two marking means since they are easily within reach on the front part of the tape measure and off to the sides. The sides of the housing for the marking means could have an indicator showing where the marker comes out at the bottom. This would make it easier to identify the specific increment the marker will make its mark. The side marking means indicators could also be situated to align with the jacket's housing frontal bottom edge for another source of identifying where the marking means makes its mark in relation to the increment on the measuring tape.

The marking means have their own independent plungers that keep them depressed as one would push down on them to have them exposed from the bottom to mark off. Thus, one would either press down the left or the right one, depending on which marker they chose since they each could be housing a different type of marker. The marking means could also be made to lock in the open position, similar to an ordinary click pen. This way it can remain open until actuated from the plunging source to retract back in its housing. Same manner the conventional click pens are made to operate. One push down and it locks in place to continuously mark or use as a pen to write with and another push down to make it retract back in the housing.

There are tape measures that have a thumb actuator when pressed all the way down and lock the tape measure in place. This could be modified to have a slide built on to the thumb actuator. The slide can be shifted from left to right and when doing this, could make it connect with the marking means plunger. Perhaps extending itself as a finger over the top of the marking means plunger or some other fashion of engagement. Thus, if the slide would shift to the right and then pressed down, it would also bring down the right sides plunger bringing the marker to the open position for marking. If the slide would be slid over to the left, it would engage with the left side marking means. In either case, further depressing of the thumb actuator can now lock the marking means and the chosen marker in an open and locked position for multiple markings to be made on an object with the same fixed increments. The slide would be optional to engage on any of the markers. It could just as well stay in the center and not engage itself with any of the markers and one could just as easily use the invention as if the slide was not present. This option would be one for the user if they chose to have the thumb actuator be the main controller over the two independent marking means. The advantage in having this is that if the slide is engaged with the marker, the user may now simultaneously enable the marking means to protrude from its housing for marking and be able to lock this increment in position for multiple similar markings.

BRIEF DESCRIPTION OF THE DRAWINGS

Other objects, advantages, features and characteristics of the present invention, as well as methods, operations and functions, will become apparent upon consideration of the following detailed description with the accompanying drawings which disclose the embodiments of the present invention. It should be understood however, that the drawings are designed for the purpose of illustration only and not as a definition of the limits of the invention.

In the drawings, wherein similar reference characters disclose similar elements throughout the several views.

DETAILED DESCRIPTION OF THE PREFERRED EMBODIMENTS

Figure 1:
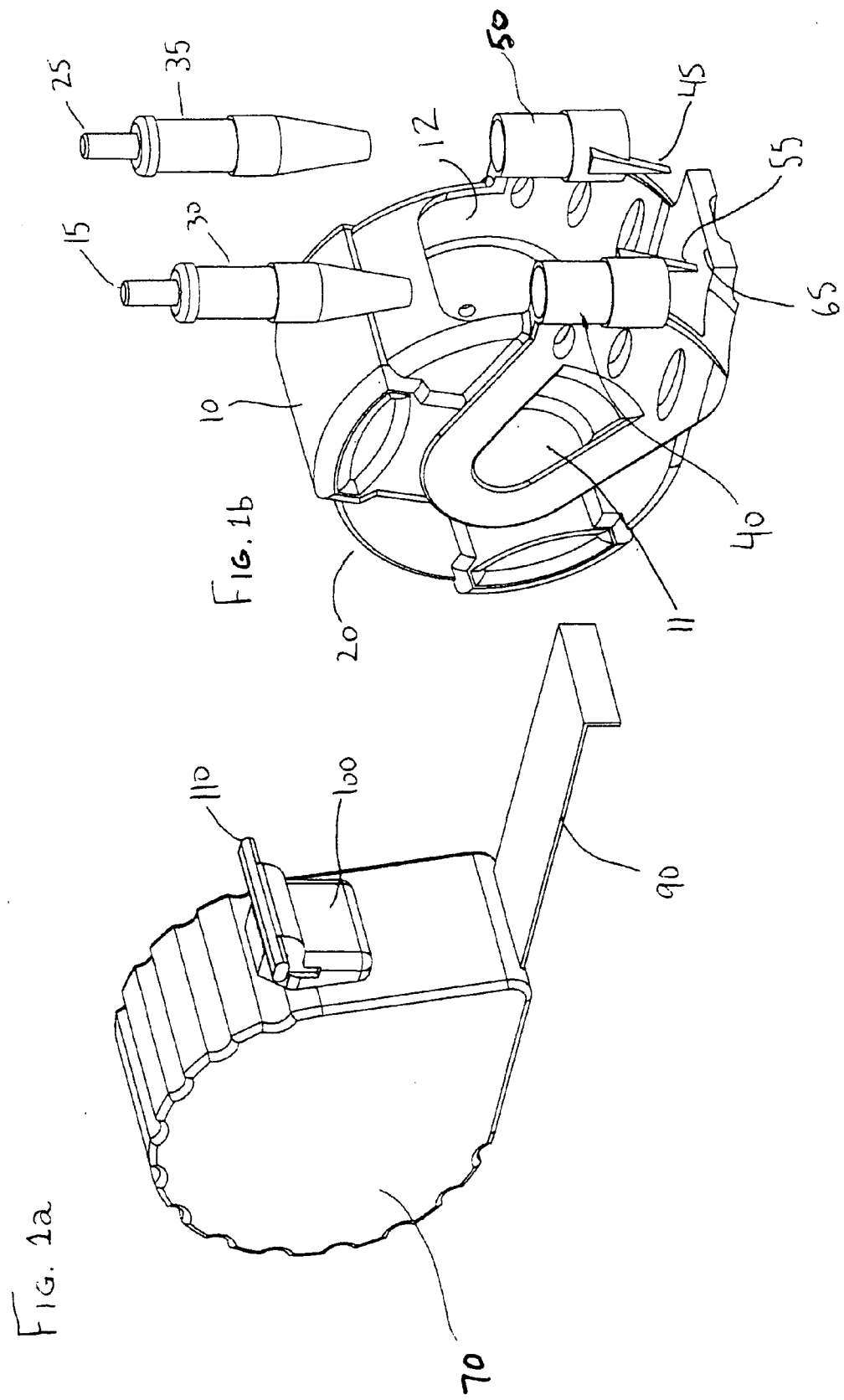
FIG. 1a shows an isometric view of a tape measure with a partially extended coil and a tape locking mechanism with a multi position slider tab attached to it.
FIG. 1b shows an isometric view of the preferred embodiment of a universal tape jacket with an exploded view of two marking means, which can be fitted into the universal tape jacket.

Referring to FIGS. 1a & 1b, there is shown a jacket 10. The opening 20 is in the back of the universal jacket 10 where the tape 70 can be inserted in. An outer surface wall 11 of jacket 10 is shown in FIG. 1b and an opposing inner surface wall 12 form a cavity that is adapted to fit over the side walls of tape measure 70. The universal jacket 10 has two separate marking means housings, 40 & 50, which can house marking means 30 & 35 respectively. Marking means 30 & 35 are pen like marking means, which can house various types of marking means. One option may have a pen marking means and the other may have a metal scriber. It would be left as an option to the end user as to what marking means they desire to have in them. Whichever marking means may be in them, the click type plungers 15 & 25 will activate them independently. These may operate in the same fashion the conventional pen works. One click down and the marking means retracts out from its housing and stays open. Another click and it will retract back into its housing.

Figure 2:
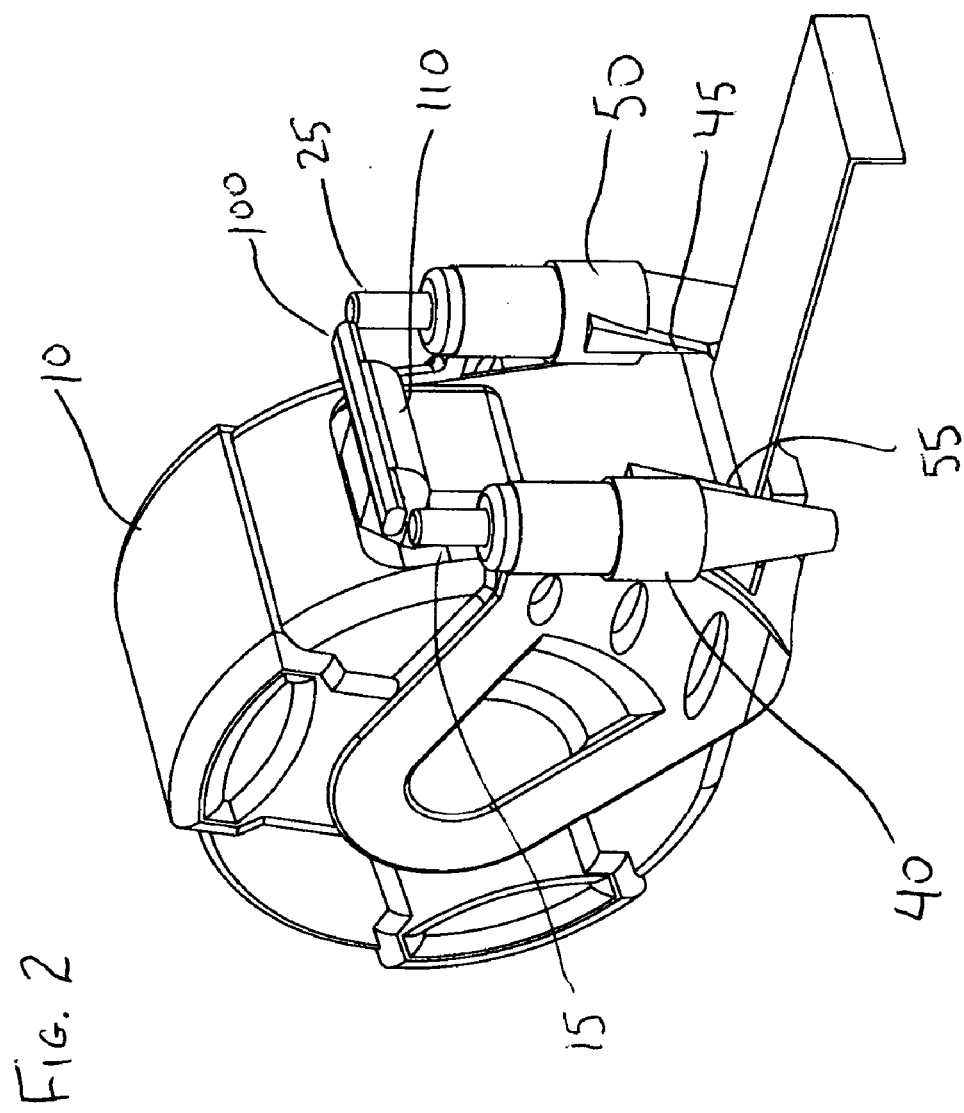
FIG. 2 shows an isometric view of the tape measure already fitted into the universal jacket and the marking means fitted in their housings within the universal tape jacket. The tape coil is also partially extended. The tape measures locking device is in the neutral position and in the unlocked mode.

Referring to FIG. 2 there is shown the tape measure fitted within the universal jacket and the marking means fitted within their housing. The tape coil is partially extended open.

Figure 3:
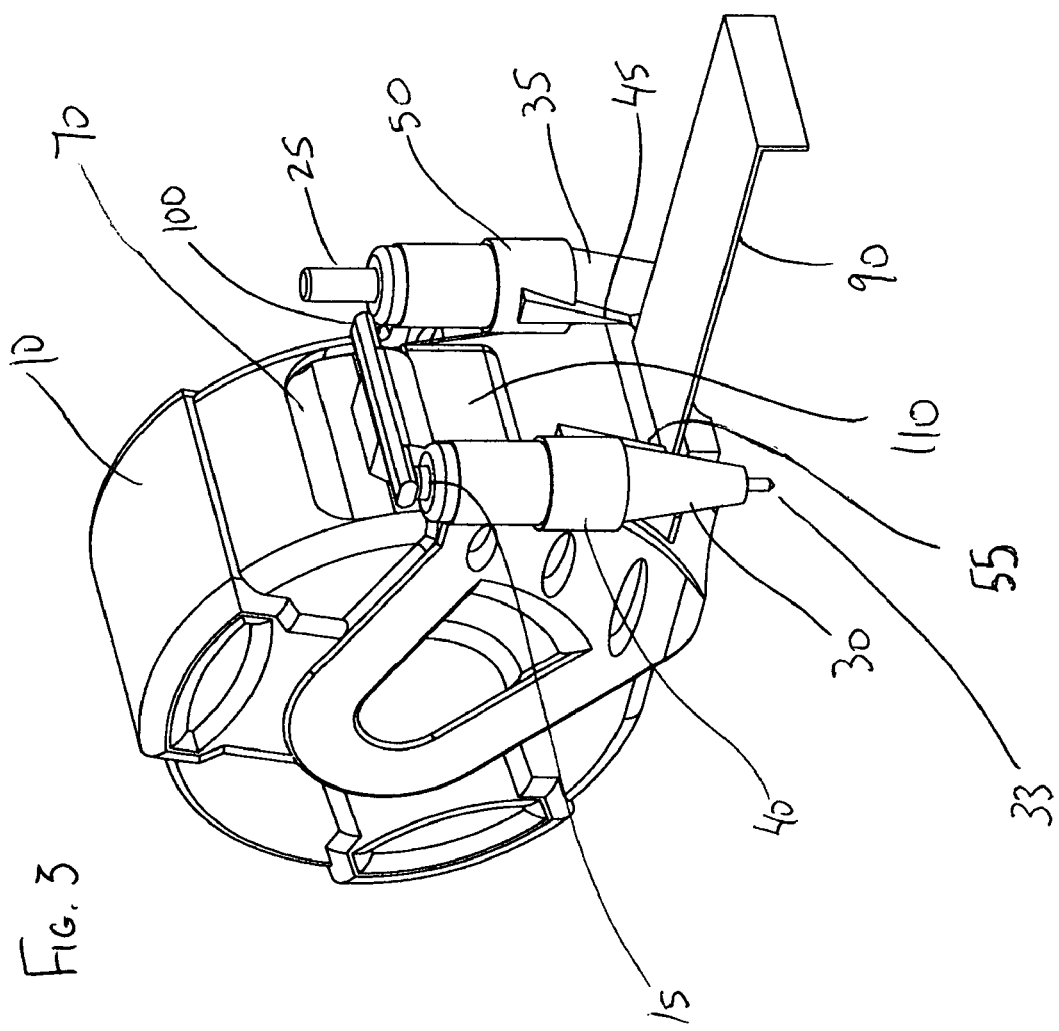
FIG. 3 shows an isometric view of the tape measure fitted into the universal jacket and the tape measures locking mechanism tab slide shifted over to engage with one of the marking means and the tape mechanism is in the locked down mode with the marking means engaged to be in the open position for marking.

Referring to FIG. 3 there is shown the jacket 10 over the tape measure 70 fitted in its place with extended coil 90. The slider 100 on locking tab 110 is slid over to negotiate with the pen like marking means tab 15 of marking means 30. The locking tab 110 is in the locked down position and slide 100 is shifted over to engage with tab 15 of marking means 30. The tape coil 90 is now in a locked position and marking means point 33 is being held in an open and protruded position from the marking means 30 housing. This marking point 33 is in a fixed position to mark off the fixed increment on the tape coil 90 where indicators 45 and 55 are pointing. Marking indicators 45 & 55 coincide with the marking points of either marking means. Therefore, one may look at either one or both and this will show them the increment on coil 90 of where the marking means will mark off if activated and applied to do so.

Figure 4:
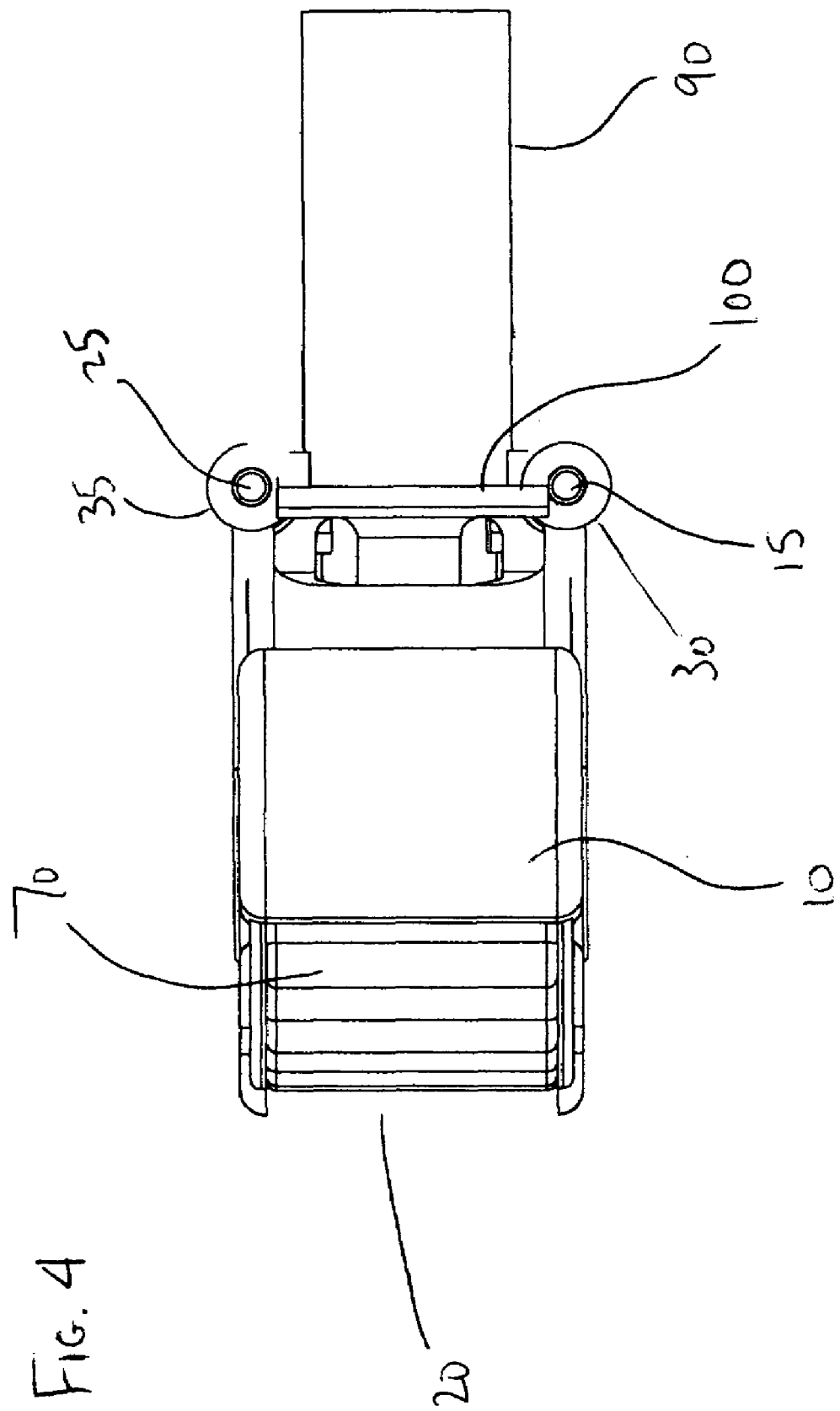
FIG. 4 is a top view of a tape measure within the universal jacket. The tape coil is partially open and extended. The tape locking mechanism is in the neutral position.

Referring to FIG. 4 there is shown a top view of the jacket 10 over the tape measure 70 with extended coil 90. Slide 100 is shown in the neutral position. Thus, if the tab 110 was to be engaged to lock down on the coil 90, marking means 30 & 35 would not be engaged to bring out a marker and one would have to manually press down on either tab 15 and/or 25 to bring either or of the marking means in an open position for marking.

Using drawings FIG. 2 & FIG. 3 along with the following hypothetical situations, as examples will make apparent the versatility of this invention in its preferred embodiment. In its preferred embodiment, the invention would look like in FIG. 2 where the tape coil within its housing, typically made of plastic, are already fitted within the universal tape jacket, which would be favorably made out of rubber offering protection to the plastic housing and afford gripping characteristics to the user. The marking means housing on the universal tape jacket of 40 and 50 are already housing marking means with a plunger attached to them 15 and 25 respectively.

Marking means 15 would be a pressurized ink cartridge as made by "Fisher space pen". This type of marking means is made of indelible ink and is pressurized, thus it will be able to write upside down, on almost any surface even wet, and will not freeze over. Having all these characteristics would make this marking means the most favorable one to use with this invention. These characteristics of this type of pen have been out in the market and have been tested with remarkable results. "Fisher space pen" claims NASA has used this pen with outstanding results in outer space, hence, the name "space pen".

The other marking means attached to plunger 25 could be a metal scriber with the same dimensions as the "space" pen, thus, to be able to fit and work within the same marking means housing. This would offer the user the flexibility to house different pairs of marking means or two of the same within the universal tape jacket. The option of which markers to house in the universal tape jacket would most likely be dictated by the intended uses of measuring and marking with this invention.

For instance, a "Jack of all trades" would probably house two different marking means being there may be various tasks at hand and each requiring a different type of marking means.

One example may have it that this person has at task to mark off increments of every 16" across a ceiling for furring strips to be later attached to later apply ceiling tiles over them. This person would now hold the tape measure upside down and bottom portion of the invention facing the ceiling, not affecting the pressurized pen, which defies gravity, and thus, move the slide 100 on locking tab 110 over to the side of plunger 15. He would then open the tape to 16" and look at either marking indicator 45 or 55, he may even want to look at both to line up the tape at 16" where he will now start depressing on the tape locking means 110 to lock the tape in place at 16" and to where the engaged marker coincides to mark with the same locked in dimension. The slide 100 on tab 110 was manipulated to engage and automatically bring out the marking means 33 as shown in FIG. 3, and in this example the pressurized pen tip. FIG. 3 shows how the locking tab 110, the slide 100 and the engaged plunger 15 would look like as described.

Now using the edge of the tape measure along a perpendicular wall to the ceiling, he may mark off the first 16" increment mark on the ceiling, then move the edge of the tape measure coil to this mark and with the marking means already locked down and ready for marking at 16" again, proceed and lay his next mark, and so on and so on, until the satisfied marks have been laid along the ceiling with this method.

Having finished this task, this same person is faced with a new task of marking a stone tile across it at a desired point so it may be cut there. The user of this universal tape jacket will most likely opt to use the slide 100 on tab 110 and slide it over plunger 25 which would house the metal scribing pin. This would probably be the most favorable marking means for this particular situation and thus showing the advantages of using different marking means within the same universal tape jacket.

Let's assume this "Jack of all trades" knows he has finished any work that may have involved in using the metal scriber housed in marker means housing 50 and opts to exchange just this marker with another, say a soft felt tip marker. This worker is now faced with the task of marking across a 36" wide Formica board, a line down the center of its width. Therefore, he now goes through the same routine he did to lock it at 16" in the previous example but in this instance he needs it to be locked at 18" and does so as previously described. However, this time he chooses to keep the slide 100 on tab 110 in the neutral position. He may have chosen to keep the tab neutral and not negotiate with any of the marking means because he may not know yet which marking means would produce a more favorable line for him on this particular project.

Thus, with the locking tape opened and locked at 18", he places the edge of the tape coil along the side of the Formica board and now manually presses down on plunger 15 bringing out the marking means with the pressurized pen. He now moves the edge of the tape along the whole side of the board and scribes a continuous line down the center of the board. After doing this, he feels he wanted the line to be a little darker and wider, therefore, he manually retracts back plunger 15 bringing the marking means with pressurized ink back into its housing and then activates plunger 25 manually to bring out the felt pen marking means. He then may repeat the procedure that enabled him to make the first line with a different marking means over this same first line and yet he is assured it will be in the exact same place because he didn't have to disturb the locking means tab 110, which was always locked down during this process of determining and experimenting with which marking means would serve him best.

Likewise, he may chose to have both marking means manually retracted from their housings and affording him the luxury of making a heavier and darker mark. In this case, he may have opted to have a felt marker in both marking means housings, thus being able to produce such results.

If there would be an independent tape measure already equipped with a marking means, the universal tape jacket could be made to coincide with the tape measures marking means and offering multiple marking means to mark off for use independently of one another or simultaneously.

Therefore, within these few examples, one may see the versatility this measure and marking system affords which none of the prior arts have addressed. Also, the measuring tape housing can be easily replaced with another within this universal jacket minimizing costs of replacing a complete measure and marking means system. There are no other prior arts neither addressing this problem nor affording this flexibility.

There is no other marking means system where you can apply such a universal tape jacket over an existing tape measure and now convert it to a measure and marking system. Regardless of any other unique features that the existing tape measures may have had, this universal tape jacket would have added another unique feature with its dual marking means applied to it.

Having the two components, tape measure and universal jacket, independent from one another and then when combining them together, creates a synergism of greater results and effect of any other measure and marking system ever made or described.

While only one embodiment of the present invention has been shown and described, it is to be understood that many changes and modifications may be made thereunto without departing from the spirit and scope of the invention.

I claim:

1. A universal tape measuring system with marking means comprising:
   a) a housing;
   b) a coilable measuring tape in said housing;
   c) a tape locking means on said housing for locking said coilable tape in said housing, said tape locking means having a positionable slide thereon, said slide having a marker engaging position and a neutral position;
   d) a jacket over said housing;
   e) at least one marker housing integrated within said jacket;
   f) a retractable marker inserted into said at least one marker housing;
   g) a marker engaging means connected to said retractable marker;
   h) a marker position indicator on said jacket;
   wherein at least one of said markers is engaged with said tape locking means when said slide on said tape locking means is positioned in the marker engaging position.

2. The tape measuring system with marking means of claim 1 wherein said marker is a graphite pencil.

3. The tape measuring system with marking means of claim 1 wherein said marker is a soft tip felt pen.

4. The tape measuring system with marking means of claim 1 wherein said marker is a pressurized pen.

5. The tape measuring system with marking means of claim 1 wherein said marker is a metal scriber.

6. The tape measuring system with marking means of claim 1, wherein two or more markers are employed.

7. The tape measuring system with marking means of claim 1 wherein said housing is made of metal and said jacket is made of plastic.

8. The tape measuring system with marking means of claim 1 wherein said housing and said jacket are made of plastic.

9. The tape measuring system with marking means of claim 1 wherein said housing and said jacket are made of synthetic rubber.

10. The tape measuring system with marking means of claim 1 wherein said housing is made of metal and said jacket is made of rubber.

11. The tape measuring system with marking means of claim 1 wherein said housing is made of plastic and said jacket is made of rubber.

12. A universal tape measuring system with marking means comprising:
   a) a housing;
   b) a coilable measuring tape in said housing;
   c) a tape locking means on said housing for locking said coilable tape in said housing, said tape locking means having a positionable slide thereon, said slide adapted to be positioned in a marker locking position and a neutral position;
   d) a jacket over said housing;
   e) at least one marker housing connected to said jacket;
   f) a retractable marker inserted into each of said at least one marker housing;
   g) a marker engaging means connected to said retractable marker;
   h) a marker position indicator on said jacket; and
   i) a marker locking means connected to said marker wherein said marker locking means is coupled to said tape-locking means when said slide is positioned in the marker locking position.

13. A universal tape measuring system with marking means comprising:
   a) a plastic housing;
   b) a coilable tape in said plastic housing;
   c) a tape locking means on said housing for locking said coilable tape in said housing;
   d) a rubber jacket over said housing;
   e) a pair of marker housings integrated into said rubber jacket;
   f) at least one marker position indicator on said jacket;
   (g) at least one retractable marker inserted into said pair of marker housings;
wherein the at least one marker has a linkable means to be engaged automatically when said tape locking means is activated.

14. A process of building a tape measure and measuring and marking increments of length with said tape measure, the process comprising the steps of:
   a) building a housing;
   b) inserting a coilable tape in said housing;
   c) installing a tape locking means on said housing for locking said coilable tape in said housing;
   d) building a jacket slightly larger than said housing;
   e) inserting said housing in the jacket;
   f) providing at least two marker housings connected to said jacket;
   g) inserting a retractable marker into each of said marker housings;
   h) incorporating a marker engaging means into said retractable marker;
   i) providing a marker position indicator on said jacket;
   j) incorporating a marker locking means into said marker;
   k) extending said coilable tape to a desired increment of length;
   l) engaging said tape locking means in position;
   m) aligning said tape to work piece where incremental markings are needed;
   n) engaging said marker in marking position;
   o) locking said marker in position;
   p) activating said marker momentarily;
   q) disengaging said marker when desired increments of length have been marked;
   r) unlocking said tape locking means; and
   s) retracting said marker and said tape for next use;
   wherein one of said markers is automatically engaged when said tape locking means is activated.

15. The process of claim 14 wherein said marker is a graphite pencil.

16. The process of claim 14 wherein said marker is a soft tip felt pen.

17. The process of claim 14 wherein said marker is a pressurized pen.

18. The process of claim 14 wherein said marker is a metal scriber.

19. The process of measuring and marking increments of length of claim 14 wherein said housing is made of plastic and said jacket is made of rubber.

20. The process of claim 14 wherein said housing and said jacket are made of plastic.

21. The process of claim 14 wherein said housing and said jacket are made of synthetic rubber.

22. The process of claim 14 wherein said jacket is made of flexible material so as to accommodate housings with coiled tapes of variable sizes.

23. A marking device for a tape measure, comprising:
   a) a jacket adapted to be removably placed over and substantially enclosing a tape measure housing having a coilable tape inserted therein;
   b) at least one marker housing integrated within said jacket;
   c) a retractable marker inserted into each of said at least one marker housing;
   d) a marker engaging means connected to said retractable marker;
   e) a marker position indicator on said jacket;
   f) a linkable means to couple said marker engaging means to a tape locking means on the measuring tape housing.

\* \* \* \* \*